United States Patent [19]
Van Duijnhoven et al.

[11] Patent Number: 6,007,850
[45] Date of Patent: *Dec. 28, 1999

[54] BAKING IMPROVER

[75] Inventors: Anton A. G. Van Duijnhoven, Wagenberg; Martin Hoogland, Laren; William James N Marsden, Naarden; Jan Visser, Huizen, all of Netherlands

[73] Assignee: Quest International B.V., Naarden, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/640,842
[22] PCT Filed: Nov. 7, 1994
[86] PCT No.: PCT/EP94/03663
 § 371 Date: May 7, 1996
 § 102(e) Date: May 7, 1996
[87] PCT Pub. No.: WO95/13706
 PCT Pub. Date: May 26, 1995

[30] Foreign Application Priority Data

Nov. 17, 1993 [EP] European Pat. Off. .............. 93309163

[51] Int. Cl.⁶ ...................................................... A21D 2/00
[52] U.S. Cl. ............................... 426/20; 426/18; 426/19; 426/21; 426/549
[58] Field of Search ................................... 426/18, 19, 20, 426/21, 27, 28, 31, 44, 49, 52, 62, 549

[56] References Cited

U.S. PATENT DOCUMENTS 4,248,896 2/1981 Wallace ..................................... 426/19
4,666,719 5/1987 Spiller ..................................... 426/18

FOREIGN PATENT DOCUMENTS

| 816 571 | 12/1974 | Belgium . |
| 162 805 | 11/1985 | European Pat. Off. . |
| 154 658 | 4/1958 | France . |
| 39 05 055 | 8/1990 | Germany . |
| 184 606 | 9/1936 | Switzerland . |
| 523 262 | 1/1946 | United Kingdom . |
| 1539756 | 1/1979 | United Kingdom . |

OTHER PUBLICATIONS

Hullett, et al: "Biological elimination of glutathione from wheat germ and flours used in bread making", Cereal Chemistry, vol. 18, 1941, pp. 561–572, see p. 562, line 5–line 17—see p. 564, line 11–line 18.

Potter, N. N., Food Science, AVI Publishing Company, Inc., Westport, CT, 1978,pp.509–519.

*Primary Examiner*—Leslie Wong
*Attorney, Agent, or Firm*—Pillsbury Madison & Sutro Intellectual Property Group

[57] ABSTRACT

The present invention relates to a process for preparing a baking improver based on fermented cereal germs. Such a baking improver can alleviate some of the negative side effects in dough handling properties associated with dough rich in gluten. As an additional benefit, the baking improver contributes to the flavour and/or aroma of baked goods. Preferred cereals for this purpose are wheat, barley and rye.

25 Claims, No Drawings

BAKING IMPROVER

This application claims benefit of international application PCT/EP94/03663 filed Nov. 7, 1994.

The present invention relates to a process for preparing a baking improver.

It is generally known that a certain amount of gluten is needed in dough for obtaining a desired specific volume and stability of the dough. To this end, it is preferred to prepare dough from a flour which is rich in gluten. Since some flours are by nature poor in gluten content, the amount of gluten present in the dough may be increased by adding gluten as a separate ingredient. However, a dough rich in gluten may be tough and inflexible, thus resulting in a dough which is difficult to process in machine baking of loaves of bread or other dough products.

There is no reference known dealing with the problem as identified above, and thus there is no suggestion in the prior art how to solve this problem.

We have now found a way of alleviating said negative side effects in dough handling properties associated with dough rich in gluten.

It has been found that by subjecting cereal germs to a fermentative treatment using starter cultures comprising lactic acid producing bacteria and/or propionic acid producing bacteria, a product is obtained which, when added to dough, removes the major disadvantage of using gluten as a baking improver. It may be preferred to add yeast to the mixture to be fermented. Thus, the addition of the fermented cereal germs according to the invention to a dough which contains gluten will give a dough which has an increased volume and stability whilst it is still very flexible and strong and has a fine dough structure, which all leads to a dough which is easy to process and which will give good results on baking.

It was found that besides a beneficial effect on the rheology of dough, the fermented cereal germs according to the invention can improve the aroma and/or flavour of the baked goods prepared by baking a dough which comprises the cereal germs according to the invention.

Using cereal germs for the preparation of a useful baking improver has the additional benefit that the raw material (cereal germs) is a side-product obtained when preparing flour from cereal. Generally, the obtained cereal germs are seen as waste material without any value, and are in some cases added to feedstock for animals.

Improved results, both regarding to dough rheology as well as flavour/aroma development can be obtained when prior to or during fermentation the cereal germs are subjected to an enzyme preparation comprising protease activity. Likewise, the addition of an enzyme preparation comprising carbohydrase activity prior to or during fermentation may contribute to one or both of the mentioned effects. A preferred carbohydrase for this purpose is α-amylase. In particular cases a pectinase enzyme preparation may be added prior to or during fermentation.

Preferred microorganisms for carrying out the fermentation are starter cultures comprising lactic acid producing bacteria such as bacteria of the genus Lactobacillus. More preferred lactic acid bacteria are lactobacilli such as *Lactobacillus plantarum* or *Lactobacillus brevis*. When yeast is also present during fermentation, this is preferably *Saccharomyces cerevisiae*.

The fermentation of the cereal germs can be carried out using a level of solids of between 20 and 40% by weight, and can be carried out in any hygienic fermentation vessel with provisions for good mixing and temperature control (generally 20–50° C.). Prior to fermentation the whole fermentation matrix may be pasteurized or sterilized in-situ, or continuously by using a HTST equipment. Usually, the fermentation process is completed within 48–72 hours, and the matrix is pasteurized or sterilised again in order to inactivate enzymes and-or viable organisms.

Fermentation, optionally in the presence of enzymes, of the cereal germs can be carried out in a conventional way. The resulting composition may be processed in various ways. Processing may include methods of stabilising/preserving the final product, such as by chilling (e.g. to refrigerator temperatures), by deep freezing or by drying (e.g. by use of spray-dryer, freeze dryer, ring-dryer, fluid-bed dryer or vacuum-band dryer equipment). The fermented cereal germs may be added as such or the fermented cereal germs or may be added to a carrier material such as a starchy matter like flour or it may be diluted with such a material.

An aspect of the invention are cereal germs obtainable by a process as set out above.

The term "baked goods" is herein to be understood to comprise bread products such as tin bread, loaves of bread, french bread as well as rolls, cakes, pies, muffins, yeast raised and cake doughnuts and the like.

The term "baking improver" is herein to be understood to be a composition comprising at least one component which improves the properties of dough and/or of the baked goods prepared thereof in at least one respect. Examples of such improvements include dough rheology, dough handling, specific volume, dough stability, dough flexibility, dough tolerance, appearance of baked goods prepared of the dough (i.e. colour, flavour, aroma), it may be associated with the structure or texture of the baked goods or with staling properties and shelf life stability etcetera. The fermented cereal germs according to the invention may be added as such to flour or dough or may be used as a part of other bakery ingredients, such as bakery ingredients further comprising components which are traditionally seen as baking improvers, such as enzymes (α-amylase, xylanase, glucose oxidase, peroxidase etc.) emulsifiers (mono- and diglycerides), salts (e.g. $KBrO_3$) or others.

By adding to dough fermented cereal germs according to the invention the properties of dough and/or of the baked goods prepared thereof like the flavour and/or aroma can be improved.

The fermented cereal germs according to the invention may be added to flour or dough in an amount of between 0.01 and 5%, preferably between 0.1 and 1% by weight, based on the total amount of flour.

Although the subject of the invention relates to the preparation of a baking improver by fermentation of cereal germs, optionally in the presence of enzymes, other parts of the crude cereal grains may be present as well, like endosperm, bran or flour.

Preferred cereals for the providing fermented cereal germs according to the invention are wheat, barley and rye, with wheat being the most preferred.

Use of fermented cereal germs, such as e.g. fermented wheat germs, fermented barley germs or fermented rye germs as a baking improver are also part of the invention as set out above.

The invention is further exemplified by the following examples, but it is in no way limited thereto.

EXAMPLE 1

Preparation of Fermented Wheat Germ Product

Laboratory fermentations for the production of fermented bread ingredient were carried out on a 2 liter scale using simple double walled glass fermenters (own design)

equipped with pH measurement/logging facilities using type Ingold pH electrodes in combination with type Consort R601 (Consort B.V., Antwerpen, Belgium) pH transmitters. During fermentation temperature was maintained at 30° C. through the jacket using a type Haake D8 external water circulation bath.

The fermentation matrix was prepared by filling the fermenter with 800 ml tap water and 300 grams of commercially available wheat germ flakes (Spillers). During filling the slurry was gently agitated at 50–100 rpm using a diam. 10 cm stirring blade in combination with a type MR 2000 Heidolph (Germany) stirring motor.

Fermentation was started, using the non-sterilised substrate, by the inoculation of 20 ml of a washed cell suspension ($10^9$ cfu/ml) of the homo fermentative lactic acid bacterium type *Lactobacillus plantarum* NRRL B18 368 and 0.33 ml of each of the following enzyme preparations viz. protease L30 No. S900120, biopectinase W S911129 and α-amylase amylo 300 L35 S9106112 (all Quest-Biocon).

The fermentation was stopped after 48 hours by in-situ pasteurisation (30 min –80° C.) of the whole matrix and the final preparation was subsequently freeze dried using a type Unitop 800 L Freeze Mobile 24 (The Virtis Company, Inc. Gardiner, N.Y. 12525) laboratory freeze dryer using the following drying conditions: condenser temperature –60 to –80° C., product temperature –30° C., vacuum 75 mTorr. Finally the freeze dried product was made into a fine powder using a type Tefal, Quick Foodmaster horizontal knife mixer.

EXAMPLE 2

Application of Fermented Wheat Germs in Bread

The composition of the basic recipe as used in all baking trials is shown in Table 1.

TABLE 1 dough recipe.

| Ingredient | Weight (g) | Bakers % |
|---|---|---|
| Wheat flour (type Robijn, ex Meneba) | 2000 | 97.0 |
| Yeast | 60 | 3.0 |
| Salt | 40 | 2.0 |
| Water | 1240 | 62.0 |
| Gluten powder (Cerestar 21000, ex Cerestar) | 60 | 3.0 |
| Fat | 20 | 1.0 |
| Ascorbic acid | 0.08 | 0.004 |
| α-amylase (Biobake 5000, ex Quest International) | 0.2 | 0.01 |

The ingredients were mixed and kneaded into a firm dough using a type Kemper Spiral SP 15 (Germany) kneader using the following conditions: kneading counter 300 strokes at low speed (2 minutes), followed by 900 strokes at high speed (5 minutes). Dough temperature 26° C. Dough weight 415 gram.

After kneading the dough was manually rounded up into the desired form and was given a first proof at 32° C. (relative humidity (rH)=85%) for 25 minutes. Next final moulding was carried out using a type Mono (England) moulder and the dough was given a second proof during 70 minutes at 32° C. and rH=85%.

Loaves of bread were baked in at a temperature of 240° C. (no steam) using a type Winkler-Wachtel (Germany) electric oven. Baking time 30 minutes.

Results:

Baking trials were carried out with and without adding the fermented wheat germ preparation as prepared in Example 1. To this end 2×8 (duplicate) loaves of bread were prepared and assessed on the following processing parameters:
a. Dough consistency during processing
  1=dry/stiff dough
  5=flexible dough, excellent dough handling
b. Dough stability during transport to the oven (after final proofing time)
  −− unstable dough
  ++ stable dough
c. Crumb structure
  −−=coarse structure
  ++=very fine structure
d. Taste/Flavour/Aroma
  1=Neutral.
  10=Fully developed bread aroma.
e. Staling properties (Stevens measure).
  System used: Stevens QTS 25 (computer controlled).
    Measurement method: compression. Probe: 5×5 cm square plate. Bread sample: 5×5×5 cm piece out of the middle of the loaf. Distance: 10 mm. Speed: 10 mm/min. Results: expressed as peak positive load.

The effect of the addition to dough of fermented wheat germs according to the invention was determined by comparing:
1. reference loaves of bread (without fermented wheat germs, recipe Table 1)
2. loaves of bread with fermented wheat germs according to the invention added thereto (0.32% by weight, based on the amount of flour).

Results are summarized in Table 2.

TABLE 2

| | comparative data. | |
|---|---|---|
| Parameter | Reference | Experiment |
| a | 1 | 4 |
| b | + | ++ |
| c | + | ++ |
| d | 1 | 9 |
| e after 2 days | 340 | 280 |
| e after 3 days | 400 | 310 |
| e after 4 days | 460 | 360 |

Measurement is of Peak load as measured by a Stevens texture analyzer model TXA 2.

EXAMPLE 3

In a baking trial French (wheat) bread (baguettes) were baked according to the following recipe:

| | |
|---|---|
| Flour (type Stokbrood, ex Meneba) | 2000 g |
| water | 1280 g |
| yeast | 60 g |
| salt | 40 g |
| lecithin | 6 g |
| ascorbic acid | 0.08 g |
| α-amylase (Biobake 500, ex Quest Int.) | 0.3 g |

Reference baguettes were prepared using the above recipe, which were compared with baguettes prepared using the above recipe with added thereto 3.2 g fermented wheat germs (prepared according to example 1).

Processing:

Kneading with a Kemper spiral mixer SP15, 300 counting timing, 900 counting timing. Dough temperature 26° C. Dividing and rounding by hand to give dough pieces of 360 g. First proofing: 30 minutes. Resulting pieces shaped to baguettes using a Betrand Euro 2000 S dough moulder. Second proofing: 80 minutes at 28° C., 80° RH. Dough baked 25 minutes at 230° C. (Winkler electric oven) followed by cooling for 1 hour. Baked loaves were sliced for sensory analysis.

Results:

The baguettes baked of dough according to the above recipe were considered to have a neutral fresh bread taste. The baguettes baked of dough with added thereto fermented wheat germs showed a distinctive flavour/aroma which was described as "yeasty, fresh bread, malty, aldehydes and green". This flavour/aroma was very much less distinctively present in the reference bread in which no wheat germs according to the invention were added.

We claim:

1. A process for the preparation of a dough comprising the steps of:
    (a) obtaining cereal germs as a side-product when preparing flour from cereal,
    (b) mixing said cereal germs with a starter culture comprising lactic acid producing bacteria,
    (c) subjecting said cereal germs to a fermentative treatment to produce fermented cereal germs, and
    (d) adding said fermented cereal germs to a dough.

2. Process according to claim 1 wherein the lactic acid producing bacteria comprises bacteria of the genus Lactobacillus.

3. Process according to claim 2 wherein the Lactobacilli comprise a member of the group consisting of *Lactobacillus plantarum* and *Lactobacillus brevis*.

4. Process according to claim 3 wherein the starter culture further comprises yeasts.

5. Process according to claim 4 wherein a protease is added to the cereal germs prior to or during the fermentation thereof.

6. Process according to claim 5 wherein a lipase is added to the cereal germs prior to or during fermentation.

7. Process according to claim 6 wherein a carbohydrase is added to the cereal germs prior to or during fermentation.

8. Process according to claim 7 wherein the carbohydrase comprises α-amylase.

9. Process according to claim 8 wherein the yeast comprises *Saccharomyces cerevisiae*.

10. Process according to claim 9 wherein the cereal comprises wheat, barley or rye.

11. Process according to claim 10 wherein the fermentation product is subjected to a drying step.

12. The process of claim 1 wherein the dough includes gluten.

13. A process for the preparation of a bakery ingredient which comprises fermenting cereal germs obtained as a side-product when preparing flour from cereal, by adding thereto a starter culture comprising lactic acid producing bacteria.

14. Process according to claim 13 wherein the lactic acid producing bacteria comprise bacteria of the genus Lactobacillus.

15. Process according to claim 14 wherein the Lactobacilli comprise *Lactobacillus plantarum* and/or *Lactobacillus brevis*.

16. Process according to claim 14 wherein the starter culture further comprises yeasts.

17. Process according to claim 14 wherein a protease is added to the cereal germs prior to or during fermentation.

18. Process according to claim 14 wherein a lipase is added to the cereal germs prior to or during fermentation.

19. Process according to claim 14 wherein a carbohydrase is added to the cereal germs prior to or during fermentation.

20. Process according to claim 19 wherein the carbohydrase comprises α-amylase.

21. Process according to claim 16 wherein the yeast comprises *Saccharomyces cerevisiae*.

22. Process according to claim 14 wherein the cereal comprises wheat, barley or rye.

23. Process according to claim 14 wherein the fermentation product is subjected to a drying step.

24. In a method of baking dough which includes gluten, the improvement which comprises including in said dough, as a baking improver, the fermentation product obtained by fermenting cereal germ obtained as a side-product when preparing flour from cereal, by adding thereto a starter culture comprising lactic acid producing bacteria.

25. The method of claim 24 wherein the cereal germs comprises wheat germs, barley germs or rye germs.

* * * * *